US005179393A

United States Patent [19]

Takahashi

[11] Patent Number: 5,179,393

[45] Date of Patent: Jan. 12, 1993

[54] AUTOMATIC LEAD FEEDING APPARATUS OF AUTOMATIC DRAFTING MACHINE

[75] Inventor: Isamu Takahashi, Tokyo, Japan

[73] Assignee: Mutoh Industries Ltd., Tokyo, Japan

[21] Appl. No.: 606,210

[22] Filed: Oct. 30, 1990

[30] Foreign Application Priority Data

Mar. 28, 1990 [JP] Japan .................................. 2-76948

[51] Int. Cl.[5] .............................................. G01D 15/16

[52] U.S. Cl. .............................................. 346/139 R

[58] Field of Search .................................... 546/139 R

[56] References Cited

FOREIGN PATENT DOCUMENTS 0304069 2/1989 European Pat. Off. .

63-260495 10/1988 Japan .

64-78892 3/1989 Japan .

64-78894 3/1989 Japan .

64-78899 3/1989 Japan .

1-136797 5/1989 Japan .

2-29399 1/1990 Japan .

*Primary Examiner*—Benjamin R. Fuller

*Assistant Examiner*—Gerald E. Preston

*Attorney, Agent, or Firm*—Wenderoth, Lind & Ponack

[57] ABSTRACT

An automatic lead feeding apparatus is used in an automatic drafting machine adapted to exchange pencil holders between a line drawing head and a writing instrument stocker. The automatic lead feeding apparatus has a unit holder moving in a direction of approach and separation from the writing instrument stocker to take a writing instrument or pencil holder removably arranged on the stocker. In consequence, the pencil holder is exchanged between the writing instrument holder and a writing instrument holder of the stocker. A lead feeding reservoir-stocker has a plurality of lead reservoirs containing plural leads. The lead feeding reservoir-stocker is arranged above the travelling path of the writing instrument holder. Lead is fed one by one from the reservoir-stocker by a shutter placed under the stocker and the lead is pushed in the pencil holder by a predetermined distance by a lead pusher. The lead feeding reservoir-stocker and writing instrument stocker are able to be removed from the base of the automatic lead feeding apparatus.

2 Claims, 13 Drawing Sheets

AUTOMATIC LEAD FEEDING APPARATUS OF AUTOMATIC DRAFTING MACHINE

BACKGROUND OF THE INVENTION

The present invention relates to an automatic lead feeding apparatus used in an automatic drafting machine, in which lead feeding apparatus pencil holders can be automatically exchanged mutually between a line drawing head and a writing instrument stocker provided at a side of a machine frame of the drafting machine.

According to an automatic lead feeding device described in Japan Patent Laid-open No. 1-78899, the device has a writing instrument stocker provided with a lead reservoir integrally installed with the stocker, and leads in the lead reservoir drop one by one by opening and closing a shutter mechanism in order to feed or supply the lead to a pencil holder held by the writing instrument stocker.

In addition, another similar device described in Japan Patent Laid-open 2-29399 has a pencil holder containing a plurality of writing leads. The pencil holder held by a writing instrument stocker is taken out by a sliding member and moved to another position. At the position, knocks are applied to the pencil holder by means of a knocking device.

The conventional automatic lead feeding mechanism having a pencil holder containing a plurality of writing leads has the drawback that the pencil holder must be large and heavy. Consequently, it is not suitable for high speed drawing or for precise control.

Another mechanism in which the writing instrument stocker and the lead reservoir are integrally assembled has another drawback in that it is impossible to feed leads or change pencil holders of the stocker during a drawing operation of the automatic drafting machine.

It is the purpose of the present invention to provide an automatic lead feeding apparatus without the drawbacks mentioned above concerning the prior art.

It is another purpose of the present invention to provide an automatic lead feeding apparatus able to freely combine various kinds of leads.

DESCRIPTION OF THE PREFERRED EMBODIMENTS

Hereinafter, a construction of the automatic lead feeding apparatus will be explained in detail with reference to the accompanying drawings.

Figure 2:
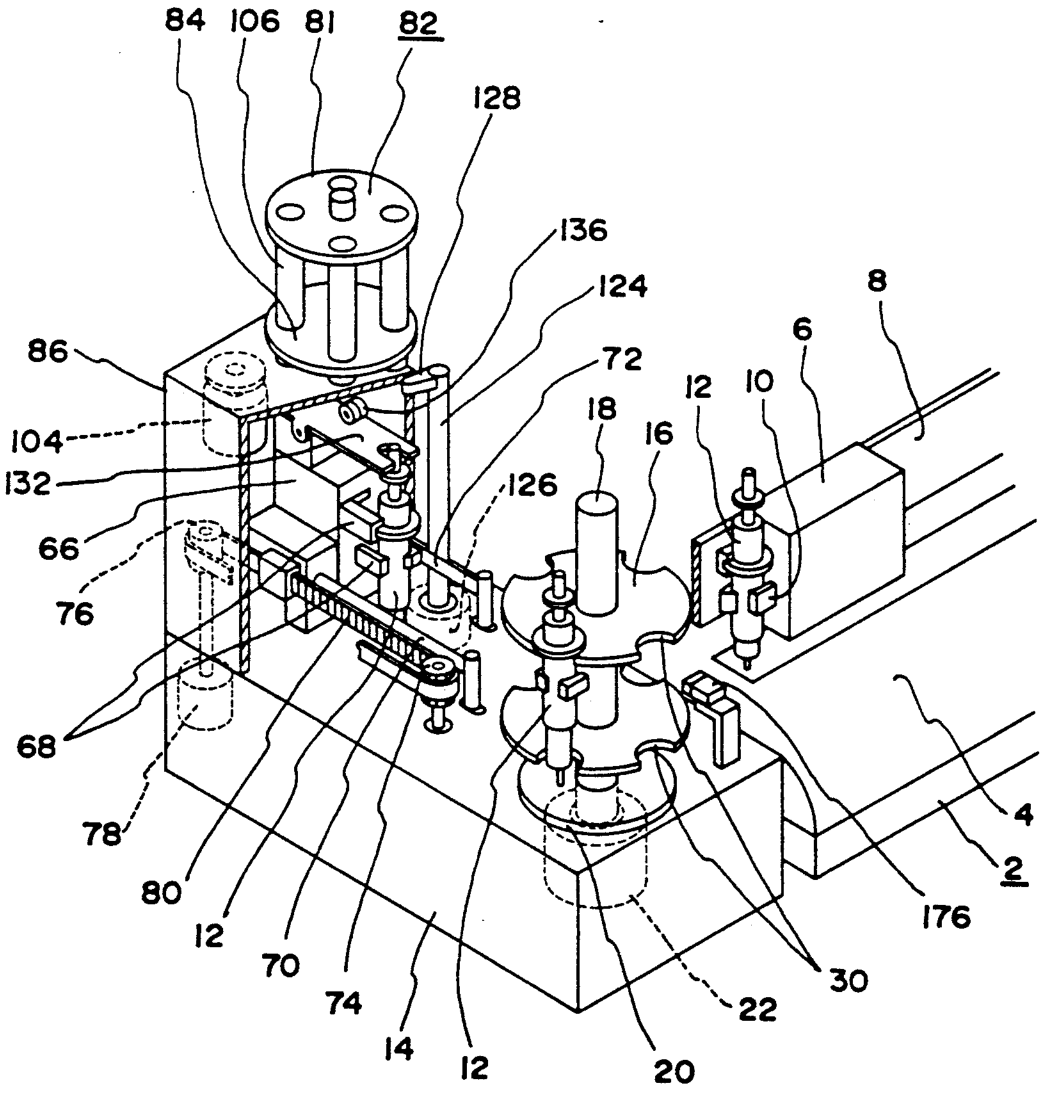
FIG. 2 is an explanatory perspective view showing the relationship between a unit holder, a writing instrument stocker, and a line drawing lead.
Figure 8:
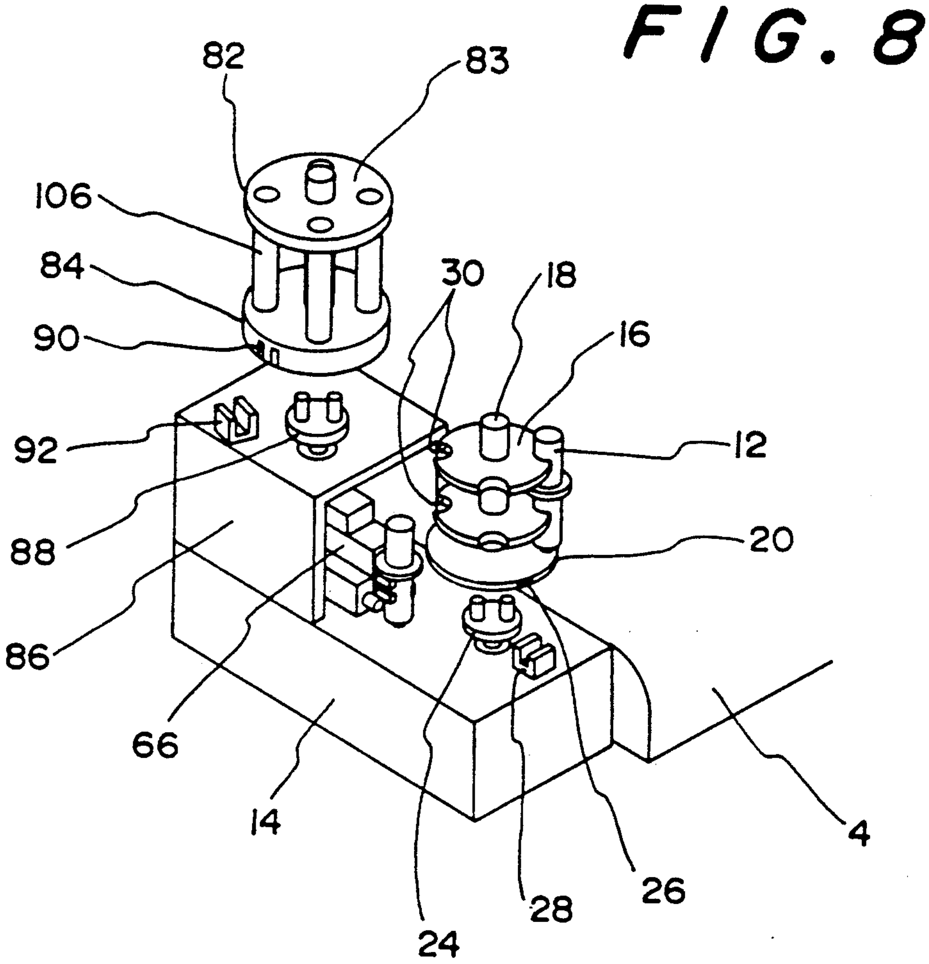
FIG. 8 is a similar perspective view depicting how a lead pushing-in motion is achieved.

In FIG. 2, 2 designates a machine frame of a paper-drive type automatic drafting machine, to which frame a paper placing plate or platen 4 is fixed. Above the platen 4, there is a Y-rail (not shown) extending in parallel with the platen 4, to which Y-rail the line drawing head 6 is movably attached. The line drawing head 6 is connected to an endless steel belt 8 extending around belt pulleys placed at both ends of the Y-rail. The steel belt 8 is adapted to be driven by a Y-motor (not shown) connected to the belt pulleys. A pinch roller mechanism consisting of a drive roller and a press roller, respectively placed at both sides of the platen 4, supports a sheet of paper on the platen 4. When an X-motor drives the drive roller, the paper on the platen 4 is sent in the X direction. The line drawing head 6 has a known type writing instrument holding means 10 cooperatively installed on a pen elevation mechanism contained in the line drawing head 6 and the writing instrument holding means 10 is adapted to removably hold a known knock-type pencil holder 12. The machine frame 2 has a box-like base 14 provided with a lead feeding mechanism, which base is fixed to the machine frame 2. As shown in FIG. 2, the base 14 has a rotary type writing instrument stocker 16 which is placed at a travelling end of the line drawing head 6 moving along the Y-rail. A lower disc member 20 fixed to a supporting shaft 18 of the stocker 16 is adapted to be detachably joined with a disc member 24 (see FIG. 8) and in turn the disc member 24 is fixed to an output shaft of a motor 22 with a reduction mechanism fixed to the base 14. It is apparent from FIG. 8 that an identification mark 26 is attached to a circumferential face of the lower disc member 20. The identification mark 26 is read by a stocker sensor 28 placed on the base 14, so that the controller recognizes an original or starting rotary position of the writing instrument stocker 16 and the existence of the stocker 16. By fitting holes formed in a bottom portion of the lower disc member 20 of the stocker 16 onto a pair of pins on the disc member 24, it is possible to detachably connect the stocker 20 to the disc member 24. The motor 22 is operatively connected to a controller having a micro computer. The pair of disc members of the stocker 16, respectively have writing instrument holding means 30 formed thereon at a predetermined interval. Well-known knock type pencil holders 12 are removably held by the holding means 30. Any one of pencil holders 12 held by the holding means 30 can be automatically replaced by another pencil holder 12 held by the writing instrument holding means 10 of the line drawing head 6. The automatic exchanging process of the writing instruments between the line drawing head 6 and the stocker 16 is well known and it is not a feature of the present invention, so the detailed explanation of the process is omitted from the description of the automatic lead feeding apparatus.

Next, the construction of the knock type pencil holder 12 will be explained with reference to FIG. 18.

Figure 18:
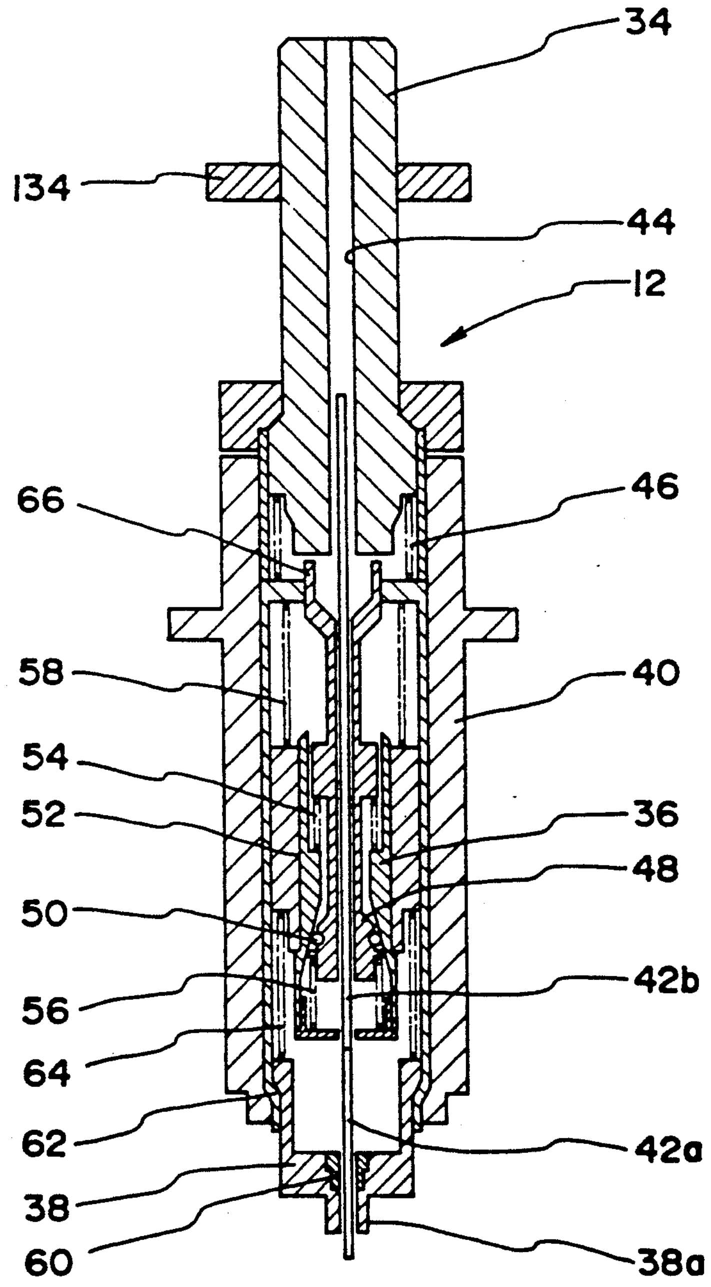
FIG. 18 is a section of a pencil holder.

In FIG. 18, 34 designates a knock mechanism, 36 designates a lead chuck mechanism, 38 designates a lead displacing mechanism, and 40 designates a case.

It is noted that the knock mechanism 34 has a lead passage 44 for holding a lead 42 and a knock spring 46 for connecting the passage 44 to the lead chuck mechanism 36.

The lead chuck mechanism 36 has a chuck member 48 divided at its end, balls 50 attached to the chuck member 48, a chuck case 52, and two chuck springs 54 and 56.

The pencil holder 12 has a chock absorbing spring 58 situated therein as shown in FIG. 18.

The lead displacing mechanism 38 formed at an end of the pencil holder 12 has a rubber ring 60 installed at a predetermined position in the mechanism 38 so as to hold a lead by suitable friction force.

An inner case 62 positions the lead chuck mechanism 36 at the predetermined position in the pencil holder 12, as well as engaging with the lead displacing mechanism 38. The mechanism 38 is held so as to vertically slide and is connected to or placed at a suitable position by means of a connection spring 64.

In operation of the knock-type pencil holder 12, a lead 42*a* held in the lead passage 44 is guided by a funnel member 66 formed at a top of the lead chuck mechanism 36, being led to a lead passage by the funnel member 66. The lead 42*a* taken into the lead passage is hereinafter called a first lead 42*a*. When the knock mechanism 34 knocks one or several times to alternatively open and close the chuck member 48, the first lead 42*a* is gripped by the chuck member 48 of the lead chuck mechanism 36. Then, an end of the first lead 42*a* generally engages with the rubber ring 60 of the lead displacing mechanism 38. After that, the lead displacing mechanism 38 is made to move in an up-and-down direction, so that the first lead 42*a* is gradually paid out.

The paying-out mechanism above will be explained in more detail. The chuck mechanism of the pencil holder is adapted to have a relatively weak lead holding force when the lead is paid out and, on the contrary, a very strong lead holding force when the lead is pushed back. Consequently, when the lead displacing mechanism 38 moves upward, the first lead 42*a* is gripped by the chuck member 48 and is not displaced. As a result, the lead displacing mechanism 38 proper moves relative to the first lead 42*a*. When the lead displacing mechanism 38 returns to its original position, the first lead 42*a* is paid out by a distance equal to its vertical stroke owing to friction force of the rubber ring 38.

After the end portion of the first lead 42*a* is paid out from an end of the pencil holder 12, it is possible to draw or write letters and lines. When the first lead 42*a* is consumed and its rear end comes out of the lead chuck mechanism 36 as shown in FIG. 18, it is impossible to carry out the writing function. After the lead comes out of the lead chuck mechanism 36, the part of the first lead 42*a* remaining must be removed from the pencil holder.

According to the above embodiment of the present invention, the lead chuck mechanism 36 of the pencil holder has a construction enabling it to carry out its grip-and-release motion or function at a fixed position in order to draw precisely, so that the mechanism 36 does not function for paying out leads. Consequently, the remaining first lead 42*a* is not able to be removed from the pencil holder, even after the first lead 42*a* is consumed and comes out of the lead chuck mechanism 36, the second lead 42*b* follows the first 42*a*, the second lead 42*b* is gripped by the lead chuck mechanism 36, and the knock mechanism 34 is actuated. Then, the first lead 42*a* is held by the rubber ring 60 of the lead displacing mechanism 38 with a predetermined friction force.

Now, the first lead 42*a* has come out of the lead chuck mechanism 36 and the second lead 42*b* has come into contact with a rear end of the first lead 42*a* as shown in FIG. 18. Then, the lead displacing mechanism 38 is pushed upward by a predetermined distance against the connection spring 64. Together with the rising of the lead displacing mechanism 38, the first lead 42*a* is urged to rise by a predetermined distance while the first lead 42*a* is being held by friction force of the rubber ring 60. However, the second lead 42*b* is coming in contact with the rear end of the first lead 42*a* and being gripped by the lead chuck mechanism 36, so that the first lead 42*a* is kept at its present position. In consequence, the first lead 42*a* advances relative to the lead displacing mechanism 38. When the mechanism 38 returns to the original position, a predetermined length gap is left between the rear end of the first lead 42*a* and the second lead 42*b*. The gap or distance corresponds to the distance the lead displacing mechanism 38 rises. Then the knock mechanism 34 is pushed down in order to open the lead chuck mechanism 36. The second lead 42*b* drops by gravity and comes into contact with the rear end of the first lead 42*a*. Repeating these two operations of pushing up of the lead displacing mechanism 38 and pushing down of the knock mechanism 34 enables feeding of the first lead 42*a*.

The lead feeding or supplying mechanism of the automatic lead feeding apparatus according to the present invention will now be described.

Figure 1:
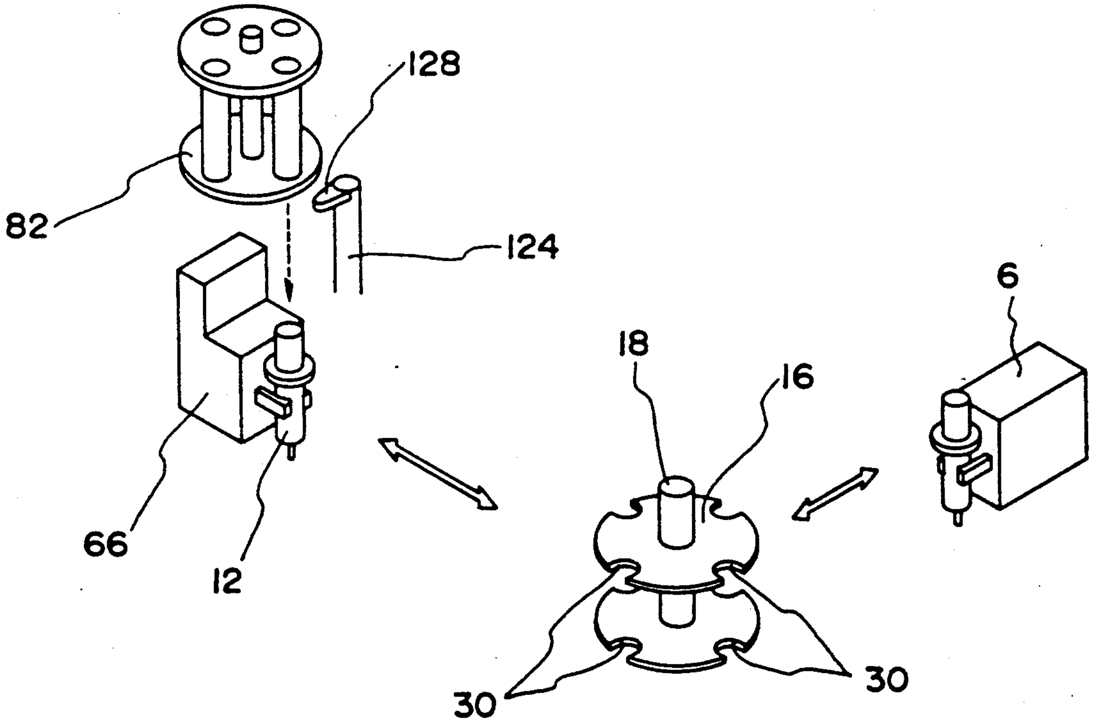
FIG. 1 is an exploded perspective schematic view of the automatic lead feeding apparatus according to the present invention.
Figure 3:
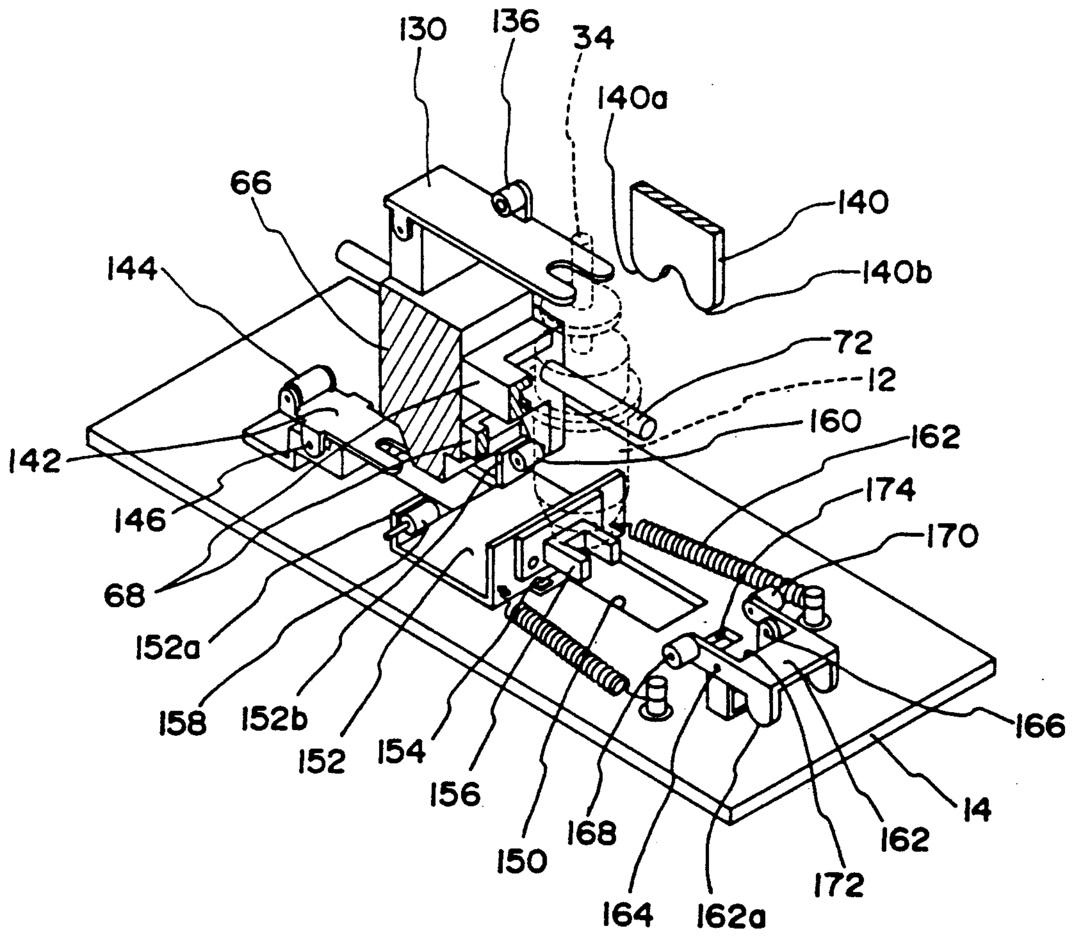
FIG. 3 is a perspective view of the automatic lead feeding apparatus.
Figure 4:
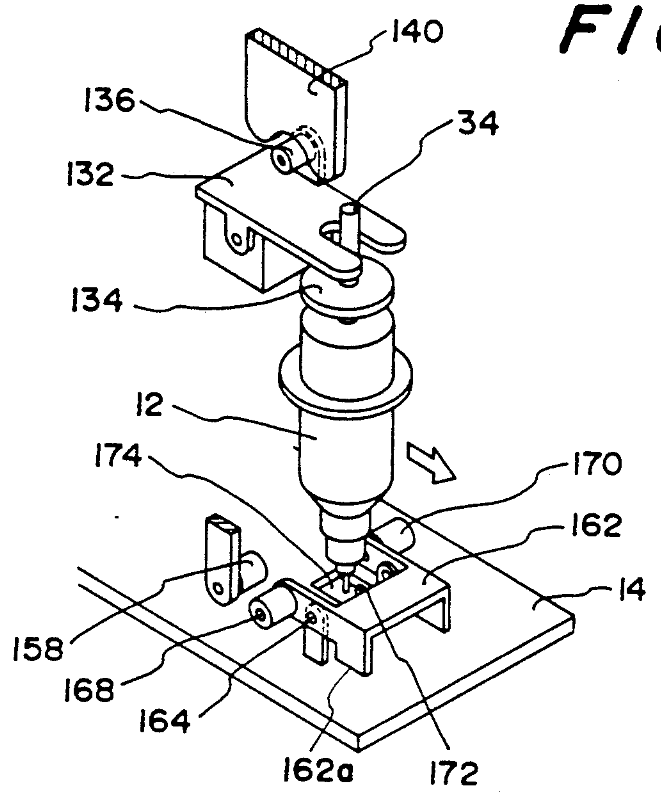
FIG. 4 is a perspective view of the unit holder.
Figure 5:
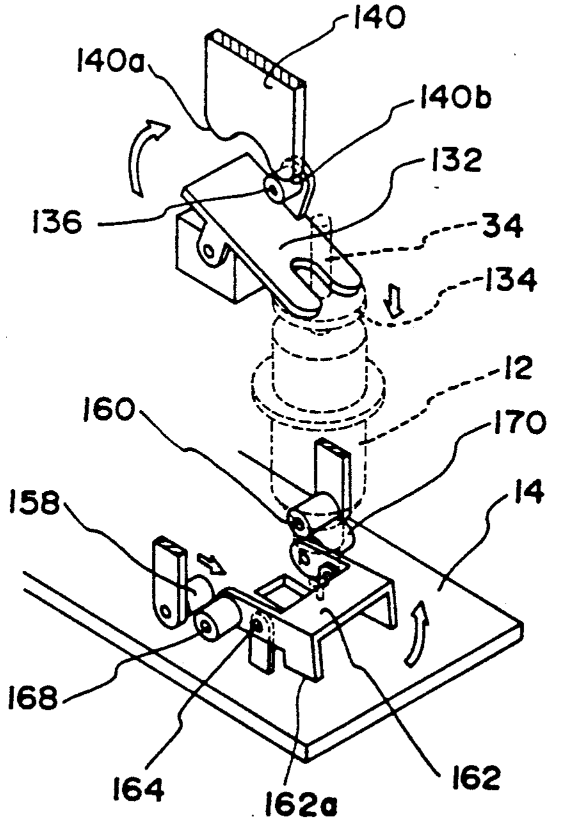
FIGS. 5 and 6 are perspective views, respectively showing how a knocking motion is achieved.
Figure 12:
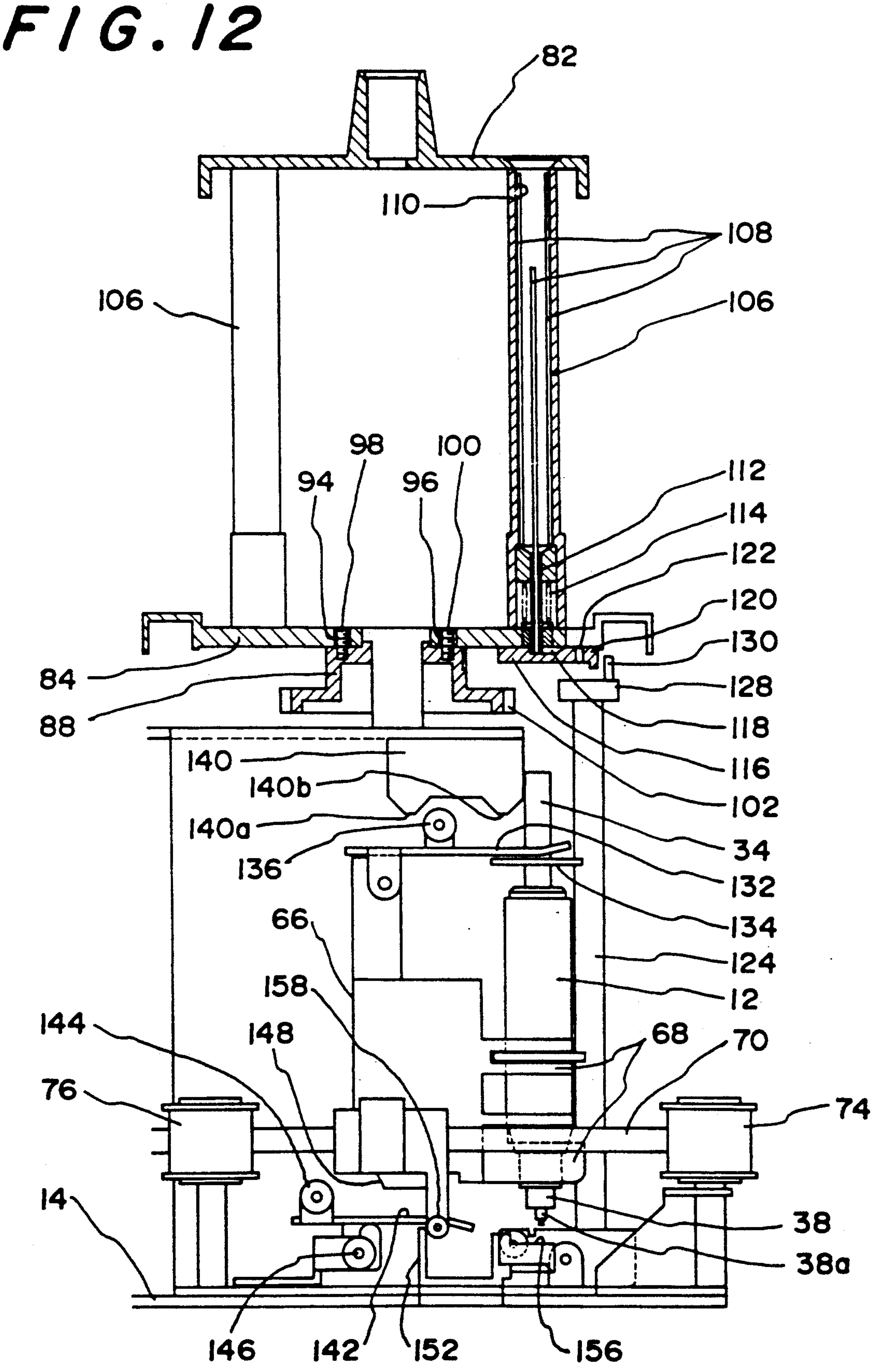
FIG. 12 is a partly sectioned side elevation of the apparatus.
Figure 13:
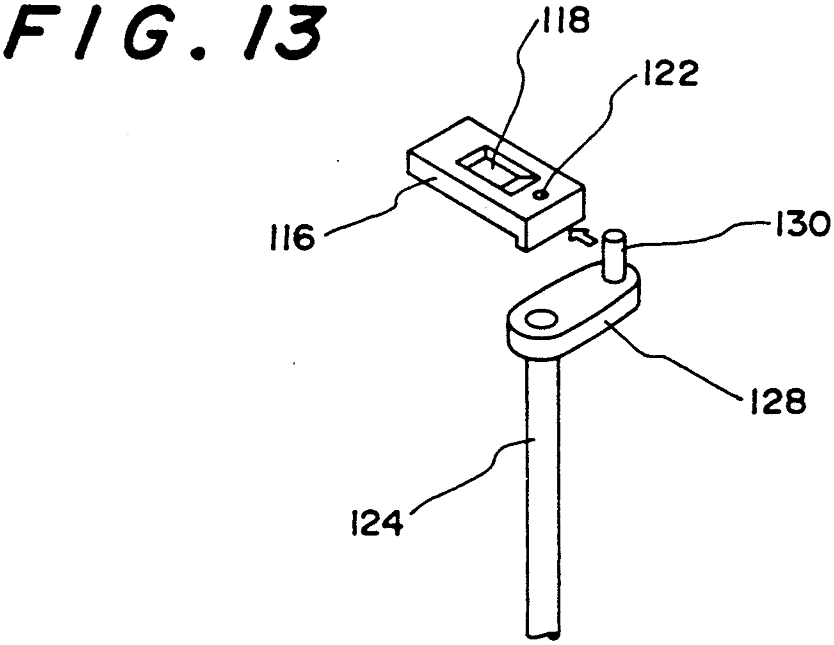
FIG. 13 is a perspective view for showing operation of the shutter plate.
Figure 14:
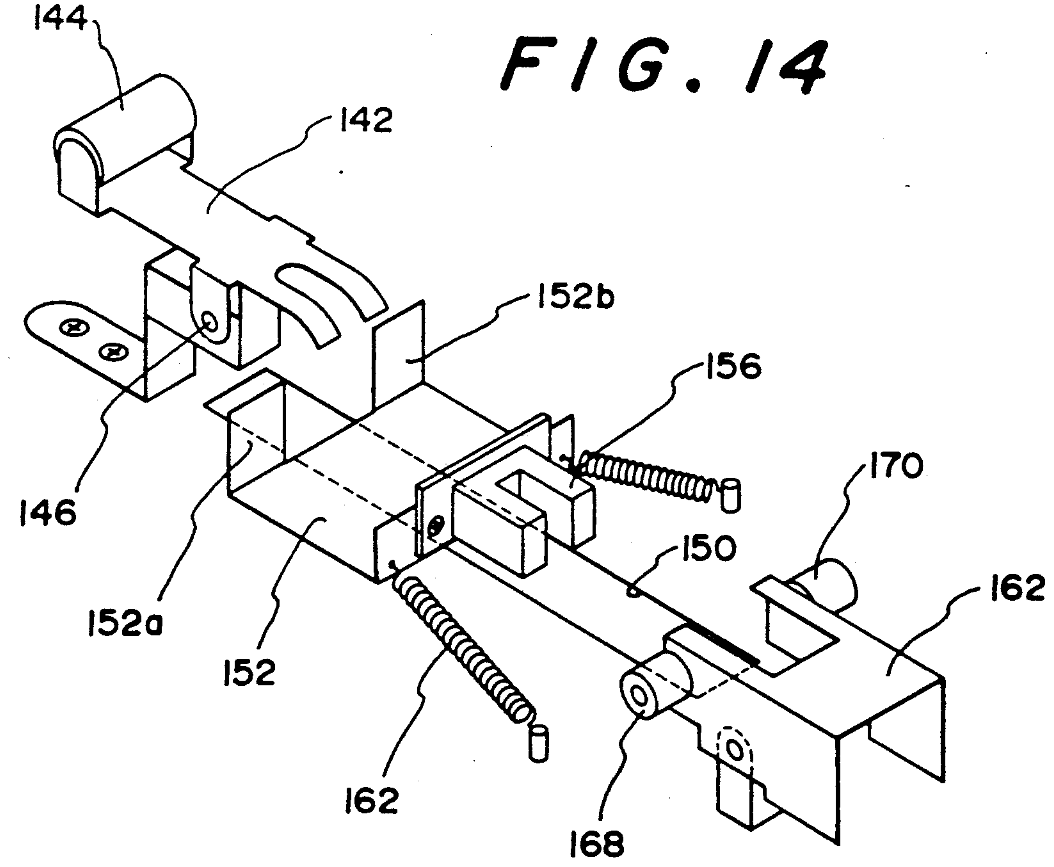
FIG. 14 is a perspective view depicting construction of a sensor fixing plate and its peripheral parts.
Figure 15:
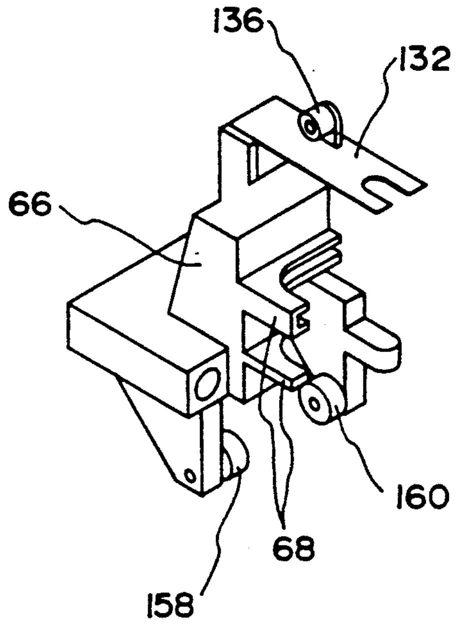
FIG. 15 is a perspective view of the unit holder.
Figure 16:
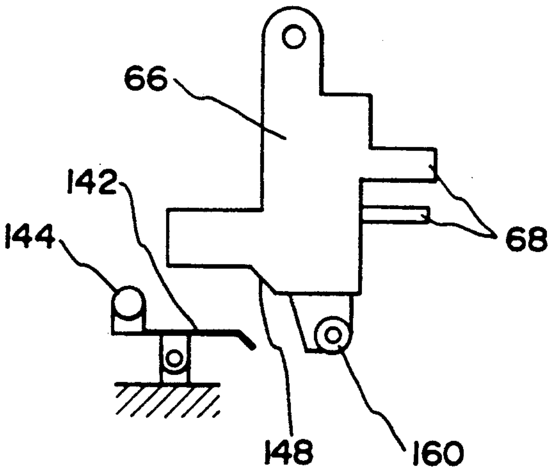
FIG. 16 is a side elevation of the unit holder.
Figure 17:
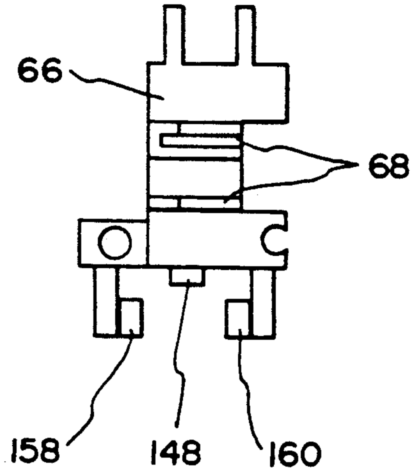
FIG. 17 is a front view of the unit holder.

A unit holder 66 has a writing instrument holding means 68 fixed at a front face of the unit holder, which means 68 is substantially the same as the writing instrument holding means 10 of the line drawing head 6. The unit holder 66 is slidably mounted on guide shafts 70 and 72 secured to an upper wall of the base 14 (see FIG. 12). The base 14 has a pair of pulleys 74 and 76, respectively installed rotatably thereon so as to be adjacent both ends of the guide shaft 70. The pulley 76 is connected to an output shaft of the motor 78. An endless timing belt 80 winds around the pulleys 74 and 76 with suitable tension. The unit holder 66 is connected to the endless timing belt 80. A lower disc 84 of a lead feeding reservoir/stocker 82 is removably attached to a disc member 88 (see FIGS. 8 and 12) rotatably supported on an upper wall of a box 86 vertically placed on the base 14. An identification mark 90 shown in FIG. 1 is provided on a circumferential face of the lower disc 84. A reservoir/stocker sensor 92 arranged on the box 86 reads the mark 90, so that a starting rotary position of the lead feeding reservoir/stocker 82 and the existence of the reservoir/stocker 82 are recognized. Pin holes (see FIG. 12) formed in the bottom portion of the lower disc 84 fit on pins 98 and 100 protruding from the disc member 88, so that the lead feeding reservoir/stocker 82 can be removably connected to the disc member 88. The disc member 88 has a circumferential gear 102 engaging with or cooperating with an output shaft of the motor 104 fixed to the box 86 through a gear transmission The reservoir/stocker 82 has lead reservoirs 106 placed between the discs 81 and 84. The lead reservoir 106 has a lead storage tank 110 for storing a plurality of writing leads 108 as shown in FIG. 12. The lead storage tank 110 has a hole at its bottom portion, through which hole a pipe-like lead guide 112 is slidably inserted. The lead guide 112 is positioned at a center of a tapered face for guiding lead formed in the bottom portion of the lead storage tank 110. A lower face of a flange formed on the lead guide 112 resiliently comes in contact with the upper face of the lower disc 84 due to the resilient force of a compression coil spring 114. The lower portion of the lead guide 112 protrudes, in this situation, from the lower face of the disc 84 a predetermined length, and the top end of the lead guide 112 as shown in FIG. 12 is level with the tapered bottom face of the lead storage tank 110. On the lower face of the disc 84, there are shutter plates 116 for every lead reservoir 106, which plates 116 are held so as to slide in diametrical directions of the disc 84. As shown in FIG. 12, the shutter plates 116 respectively have concave portions 118 provided with horizontal bottoms and slanted faces. A protrusion 120 extends downward from an end portion of the shutter plate 116 and a through shutter hole 122 is formed near the end portion. The shutter plate 116 is urged or pressed toward an outer circumference of the disc 84 and engages with a stopper provided on the disc 84. Just below the respective lead reservoirs 106, a writing instrument holding means 68 of the unit holder 66 is placed. An arm-carrying rotary shaft 124 is rotatably supported in an upper wall of the base 14 and the rotary shaft 124 is connected to an output shaft of the motor 126 installed securely in the base 14. An arm 128 is secured to a top end of the rotary shaft 124 at a right angle. A pin 130 on the top face of the arm 128 is opposed to the shutter plate 116 at a lower portion of the lead reservoir 106 positioned just above the writing instrument holding means 68. The shutter plate 116 and the arm 128 constitute a shutter mechanism for making one lead 108 drop from the lead reservoir 106. Various other kinds of shutter mechanisms can be imagined and the invention is not limited to the shutter mechanism shown. Numeral 132 designates an upper knock plate supported so as to revolve around an axis perpendicular to the guide shafts 70 and 72 and parallel to an upper wall of the base 14. The upper knock plate 132 has a forked portion receiving a knock mechanism 34 of the pencil holder 12. When the knock plate 132 is urged to raise its forked portion and the plate 132 reaches its substantial horizontal position, a rear stopper portion of the plate 132 engages with a bracket of the unit holder 66. A roller 136 is rotatably journalled on the knock plate 132 as shown in FIG. 3. A push-down plate 140 having protrusions 140*a* and 140*b* is secured to the upper wall of the box 86 in the path of the roller 136 along the guide shafts 70 and 72. To the bracket secured to the upper wall of the base 14, a lower knock plate 142 is journalled on a shaft 146 so as to rotate around an axis in parallel with the upper wall of the base 14 and at a right angle to the guide shafts 70 and 72 as shown in FIG. 3. The knock plate 142 has a forked portion receiving a small-diameter portion 38*a* of the lead displacing mechanism 38 of the pencil holder 12. The knock plate 142 is adapted to be pressed so as to lower its forced portion. When the knock plate 142 reaches its substantially horizontal position, its lower face resiliently comes in contact with the stopper face of the bracket. A roller 144 is rotatably journalled to an end of the knock plate 142 in a path of a taper portion 148 of the bottom of the unit holder 66 (see FIG. 12). Beneath the travelling path or route of the writing instrument holding means 68 of the unit holder 66 along the guide shafts 70 and 72, an upper wall of the base 14 has a remaining lead discharging hole 150 (see FIG. 3) formed therein. A sensor fixing plate 152 arranged as shown in FIGS. 12 and 14, so as to move over the remaining lead discharging hole 150 along a slide guide member 154 fixed to the base 14. A remaining lead detecting sensor 156 is placed on an upright portion of the sensor fixing plate 152 so as to be positioned just above the remaining lead discharging hole 150. Another pair of upright portions 152*a* and 152*b* of the sensor fixing plate 152 are resiliently in contact, by means of a spring 162, with rollers 158 and 160 (see FIG. 15) rotatably journalled on the lower bracket of the unit holder 66.

Next, a lead protruding length control mechanism will be explained.

As shown in FIG. 3, a lead control plate 162 is journalled on shafts 164 and 166 on the bracket on the base 14 so as to rotate around an axis perpendicular to the guide shafts 70 and 72, and horizontal to the upper wall of the base 14. The lead control plate 162 has a dent or concave portion positioned under the travelling path of the writing instrument holding means 68 along the guide shafts 70 and 72. The lead control plate 162 is urged so as to cause a stopper portion 162*a* of the lead control plate resiliently to come into contact with the upper wall of the base 14. A pair of rollers 168 and 170 are rotatably journalled to both of the side portions of the lead control plate 162, and placed in the travelling path of the rollers 158 and 160. At a position below a lea breaking edge 172 of the dent, the upper wall of the base 14 has a remaining lead discharging hole 174 formed therein. A pencil holder existence detection sensor 176 is positioned along a rotation path of the writing instrument holdings means 30 of the pen stocker 16. The motors 22, 78, 104 and 126, and the sensor 176, respectively are connected to the controller.

Figure 10:
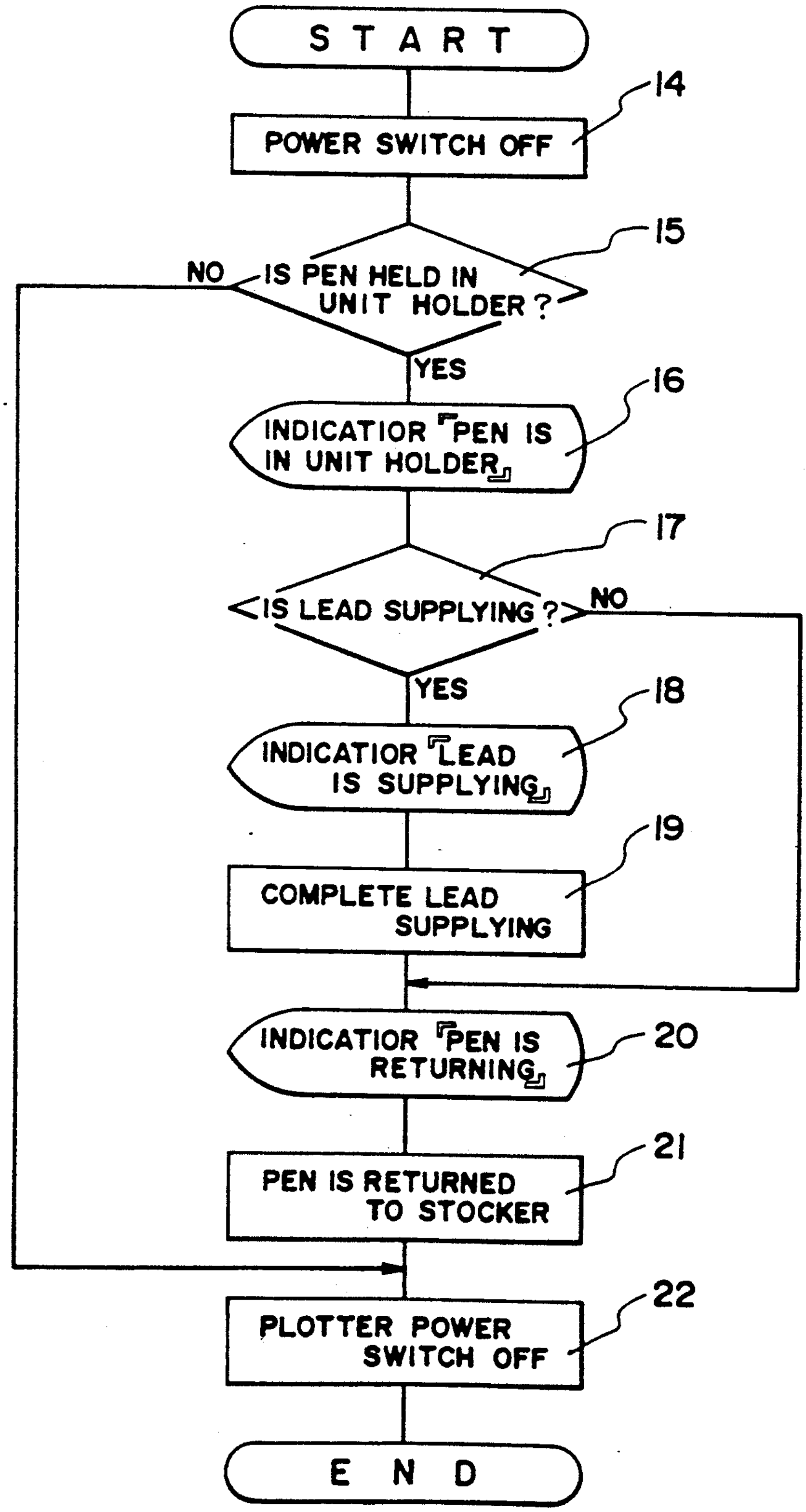
FIG. 10 is a flow chart showing operation of the automatic lead feeding apparatus.
Figure 11:
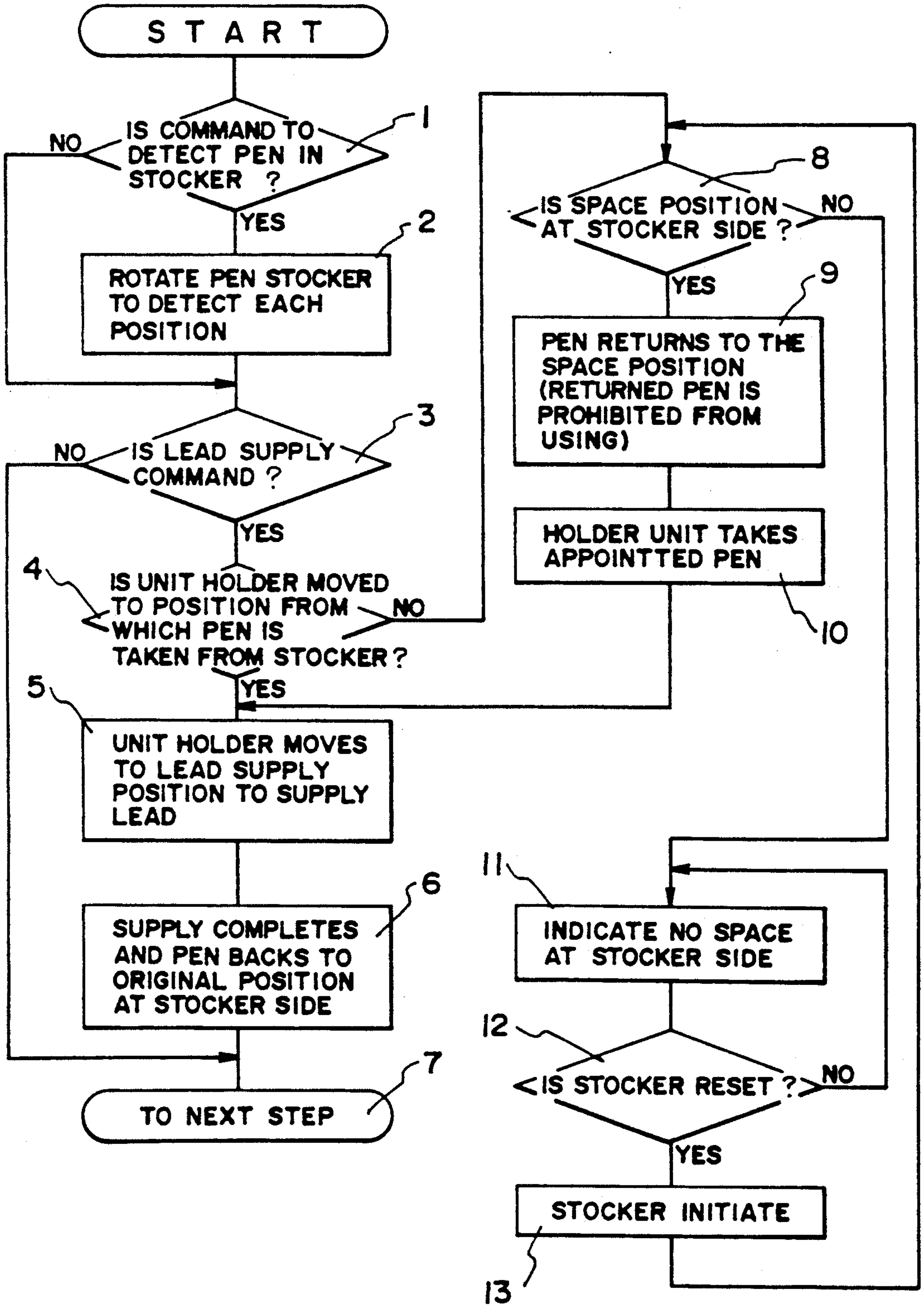
FIG. 11 is a flow chart similar to that of FIG. 10.

Operation of the automatic lead feeding apparatus according to the present invention will be explained with reference to the flow charts of FIGS. 10 and 11.

When a power source switch is turned on, the unit holder 66 is moved to an initial set position between a lead supply reservoir/stocker 82 and the writing instrument stocker 16, and waits at that position.

Figure 9:
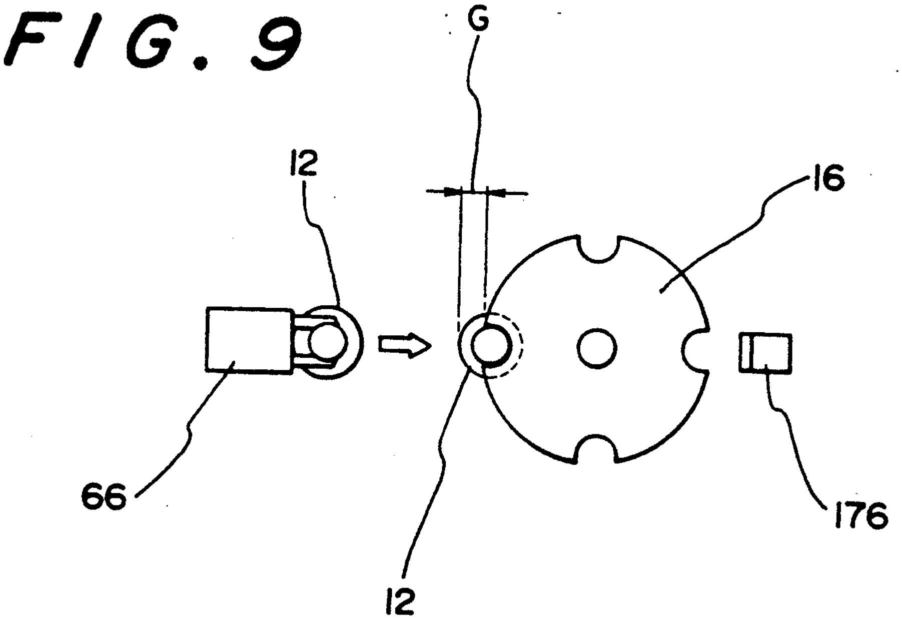
FIG. 9 is a schematic plan view of motions.

Next, the controller judges whether a pen existence detection command is ordered or not, which command indicates whether or not the writing instrument holding means 30 of the writing instrument stocker 16 holds a pencil holder 12 (a step 1). When YES or the positive is judged, the controller drives the motor 22 to rotate the writing instrument stocker 16 in order to make the writing instrument holding means 30 of the stocker 16 move in front of the sensor 176. Every time the writing instrument holding means 30 moves, the sensor 176 detects whether or not the writing instrument holding means 30 holds a pencil holder 12 according to the timing pulse from the controller. The detection signal is inputted to the controller (a step 2). Due to the detection signal from the sensor 176, the controller writes a signal indicating the presence or non-presence of the pencil holder 12 in a position corresponding to particular writing instrument holding means 30 of the writing instrument stocker 16 according to a table memorized in the memory. Next, the controller judges the existence or nonexistence of lead feeding command (a step 3). When YES is judged, the controller drives the motor 22 to rotate the stocker 16 in order to make the writing instrument holding means 30 holding the pencil holder 12 to be supplied with a lead so that it is opposed to the unit holder 66. Next, the controller drives the motor 78 to rotate the belt 80 and to move the unit holder 66 toward the writing instrument stocker 16 along the guide shafts 70 and 72. Due to the movement of the unit holder 66, the writing instrument holding means 68 grips the pencil holder 12 held by the writing instrument holding means 30 of the writing instrument stocker 16. Here, the controller judges whether or not the unit holder 66 has moved to the position at which the unit holder 66 can engage the pencil holder 12 in the writing instrument stocker 16 (a step 4). For example, when the power source is turned off during the previous lead feeding operation and the writing instrument holding means 68 of the unit holder 66 holds a pencil holder 12, the lead feeding operation is finished after the unit holder 66 holds the pencil holder 12. When a new lead feeding operation starts after the completion of a lead supply operation, the unit holder 66, together with the pencil holder 12 held thereby, will pick up the appointed pencil holder 12 in the writing instrument stocker 16 as shown in FIG. 9. In this case, a pencil holder 12 already in the unit holder 66 strikes the pencil holder 12 in the writing instrument stocker 16 and as a result the unit holder 66 stops at a position spaced from the pencil holder exchanging position by a distance G as shown in FIG. 9. This condition can be detected by the controller comparing a set movement distance of the unit holder 66 to the real movement distance in order to detect the difference G. In this situation, the controller judges the negative at a step 4 and judges the presence of a writing instrument holding means 30 holding no pencil holder in the writing instrument stocker 16 (a step 8). When it is negative, the controller displays in a display that there is no void in the writing instrument stocker 16 (a step 11). Next, it judges whether or not it is necessary to re-set the writing instrument stocker 16 (a step 12). When positive is judged, the writing instrument stocker 16 is again set to carry out an initial operation, such as an original position setting of the stocker 16 (a step 13). Then the controller's operation is transferred to step 8. When the positive is judged at the step 4 by the controller, the writing instrument stocker 16 is controllably driven to bring a vacant writing instrument holding means 30 opposite the writing instrument holding means 68 of the unit holder 66. Then, the unit holder 66 is driven toward the writing instrument stocker 16 so as to return the pencil holder 12 held by the unit holder 66 to the writing instrument stocker 16 (a step 9).

Next, the controller moves the unit holder 66 along the guide shafts 70 and 72 to a position spaced from the writing instrument stocker 16 by a predetermined distance. After that, the writing instrument stocker 16 is rotated in order to cause the selected writing instrument holding means 30 to oppose the unit holder 66. After this, the controller moves the unit holder 66 toward the writing instrument stocker 16 so that the writing instrument holding means 68 of the unit holder 66 grips the pencil holder 12 held by the selected writing instrument holding means 30 of the stocker 16. After that, the unit holder 66 backs toward the stocker 16 by a predetermined distance along the guide shafts 70 and 72. Consequently, the unit holder 66 takes the selected pencil holder 30 from the stocker 16 and holds it (a step 10). When the writing instrument holding means 68 of the unit holder 66 takes the selected pencil holder 12 from the stocker 16, the controller drives a motor 78 to move the unit holder 66 below the lead feed reservoir/stocker 82. It is noted that a pencil holder exchanging operation between the writing instrument holding means 68 of the unit holder and a holding means 30 in the stocker 16 is the same as that of a pencil holder exchanging operation between the line drawing head 6 and the stocker 16. Before the unit holder 66 starts the lead feeding operation, the controller previously rotates the lead feed reservoir/stocker 82 under controlled conditions to select one lead reservoir 106 and positions the selected lead reservoir 106 just above an upper knock plate 132. In this particular position, when the unit holder 66 moves to the lead feeding position below the upper knock plate 132, a knock mechanism 34 of the pencil holder 12 is inserted into the forked portion of the upper knock plate 132 and the flange 134 of the pencil holder 12 opposes the lower face of the upper knock plate 132. After that, the controller drives the motor 126 to rotate the arm rotating shaft 124. As a result, the pin 130 of the arm 128 pushes the shutter 116. After the shutter 116 is pushed, the lead guide 112 rides up on the slanted face of the concavity 118 of the shutter plate 116, the upper end of the lead guide 112 protrudes from the tapered bottom portion of the lead storage tank 110, preventing another writing lead 108 from being inserted into the lead guide 112.

Figure 19:
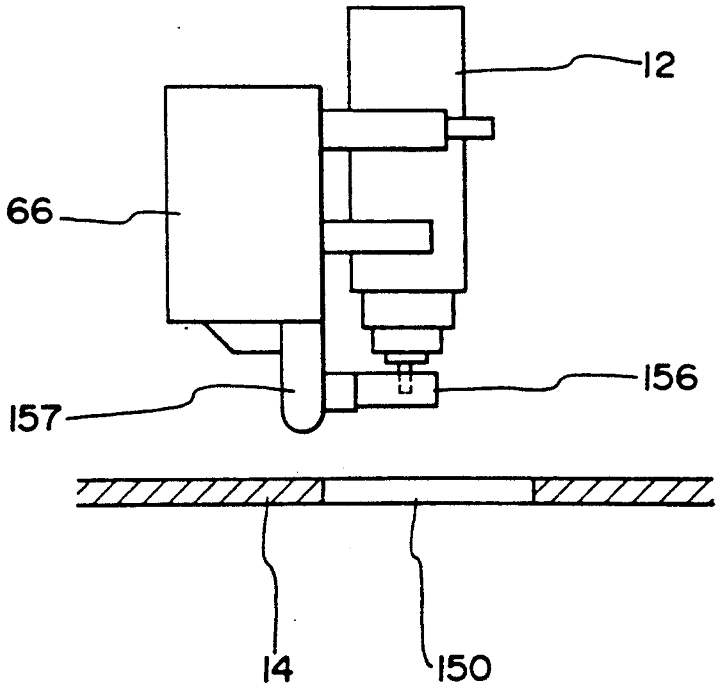
FIG. 19 is a side elevation showing another embodiment of the automatic lead feeding apparatus according to the present invention.

When the shutter plate 116 is pushed to a predetermined stop position by the pushing force of the arm 128, the shutter hole 122 of the shutter plate 116 corresponds to the lower end of the lead guide 112, and the writing lead 108 in the guide 112 drops due to gravity into the lead passage 44 of the knock mechanism 34 of the pencil holder 12. Next, the controller moves the unit holder 66 in a right-and-left direction in FIG. 2 within a predetermined range in order to push down the roller 136 by engagement with the protrusion **140*a* of the pushing-down plate 140. Consequently, the upper knock plate 132 oscillates clockwise in FIG. 12, so that the flange 134 is pushed down and a writing lead 108 is led into the lead chuck mechanism 36 of the pencil holder 12. In consequence, a lead pushing operation into the pencil holder 12 held by the unit holder 66 is finished. The controller returns the arm 128 to its original position, moves the unit holder 66 to the left in FIG. 12 passing the lead feeding position along the guide shafts 70 and 72, and accordingly the small-diameter portion 38*a* of the lead displacing mechanism 38 of the pencil holder 12 is inserted into the forked portion of the lower knock plate 142. In addition, when the unit holder 66 is moved to the left in FIG. 12, the tapered portion 148 of the unit holder 66 strikes the roller 144 lowering the roller. Lowering of the roller raises the knock plate 142 and pushes up the lead displacing mechanism 38 of the pencil holder 12 held by the writing instrument holding means 68 of the unit holder 66. By repeating this alternative pushing-up operation of the lead displacing mechanism 38 and the pushing-down operation of the upper knock plate 132 several times, remaining lead in the pencil holder 12 is caused to drop through the remaining lead discharging hole 150 and a predetermined length of a new lead protrudes from the end of the pencil holder 12. Remaining leads are detected by the remaining lead detection sensor 156 and the information is inputted to the controller. When the unit holder 66** moves to a lead feeding position and the remaining lead discharging position, the rollers 158 and 160 engage with the upright portions 152*a* and 152*b* of the sensor fixing plate 152 and consequently the plate 152 moves with the unit holder 66. When the remaining lead is discharged, the remaining lead detection sensor 156 is always positioned under the pencil holder 12 held by the unit holder 66. A mechanism causing the lead detection sensor 156 to move with the movement of the unit holder 66 is not particularly limited to the mechanism engaging the sensor fixing plate 152 mutually and cooperatively with the unit holder 66. It is possible to directly attach the remaining lead detection sensor 156 to the holder unit 66 by a fixture 157 as shown in FIG. 19.

Figure 6:
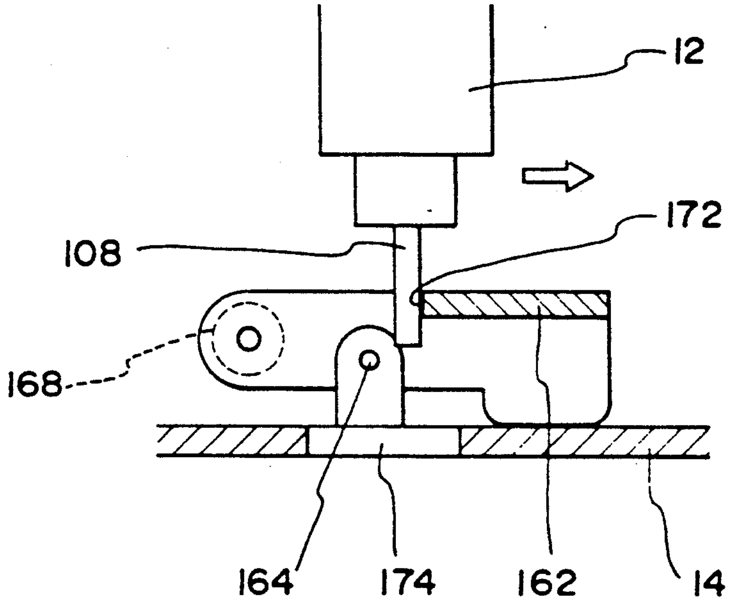
Figure 7:
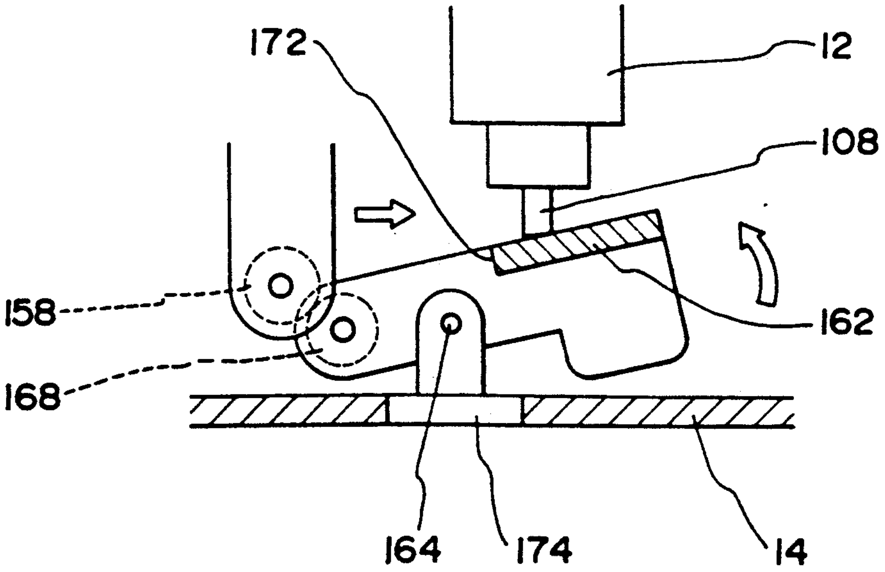
FIG. 7 is a side elevation showing lead breaking motion.

Next, the controller moves the unit holder 66 toward the writing instrument stocker 16 so as to make a lead 108 protruding from the end of the pencil holder 12 strike the lead breaking portion or edge 172 of the lead control plate 162 as shown in FIG. 6. Owing to force due to the travel of the unit holder 66, the lead 108 is broken off for obtaining a lead of suitable protruding length. When the unit holder 66 moves further toward the writing instrument stocker 16, the lead 108 protruding from the end of the pencil holder 12 moves above the lead control plate 162. At this time, the rollers 158 and 160 of the unit holder 66 push down the rollers 168 and 170 on the lead control plate 162 as shown in FIG. 7. The lead control plate 162 oscillates counter-clockwise in FIG. 7 around the shaft 164 so as to push the lead 108 projecting from the front end of the pencil holder 12 up into the pencil holder 12. During this pushing-up operation, another protrusion 140*b* on the pushing-down plate 140 engages the roller 136 and lowers the roller. The upper knock plate 132 pushes down the flange 134 and the knock mechanism 34 of the pencil holder 12 is opening to release the lead. After the operations above are finished, the controller causes the unit holder 66 to stop adjacent to and separate from the writing instrument stocker 16 so as to hold the pencil holder 12 by the writing instrument holding means 68. The pencil holder 12 for which a lead has been fed is returned to an original position of the writing instrument stocker 16 (a step 6) and it is transferred to the next step 7. When the operator turns off the power source at step 14, the controller judges whether the writing instrument holding means 68 of the unit holder 66 holds a pencil holder 12 corresponding to a table in the memory. When the presence is judged, the display displays that there is a pencil holder 12 in the unit holder 66 (a step 16). Next, the controller judges whether it is engaged in a lead feed operation or not (see step 17). When the positive is judged, the display displays a condition of lead feeding operation (a step 18) and a lead feeding operation is finished (a step 19). Next, the controller displays on the display that a pencil holder is returning (a step 20). The pencil holder 12, the lead feeding operation for which is finished, held by the unit holder 66 is returned to the original position of the writing instrument stocker 16 (a step 21). Next, the controller turns off the power source of the controller and the drive of the automatic drafting machine proper.

According to the operating sequence described above and shown in FIG. 9, it is possible to prevent the pencil holders 12 from mutually striking each other when the unit holder 66 approaches the writing instrument stocker 16 to pick up a pencil holder 12.

The lead reservoirs 128 used in the embodiment of the automatic lead feeding apparatus as shown are not particularly limited to a multi-reservoir type, and it is possible to use a one-reservoir type. The pushing-down plate 140, the upper knock plate 132, and the knock mechanism 34 of the pencil holder 12 respectively constitute a lead pushing-in means but it is not limited to that shown. It is possible to use a lead pushing-in means using a known cam disclosed in, for example, Japanese Patent Laid-Open No. 1-78899.

As described above, because the lead reservoir is placed at a separate position from a writing instrument stocker, it is possible to supply leads from the lead reservoir to a pencil holder even during operation of the writing instrument stocker. Because the writing instrument stocker is separate from a lead reservoir, it is possible to provide a simple mechanical structure of the stocker and reservoir. When a plurality of lead feed reservoir stockers for various kinds of lead are provided, it is possible to feed various combinations of different kinds of leads (for example, a lead diameter of 0.5 mm or 0.3, 0.4 and 0.5 mm). Additionally, because the lead feeding reservoir stocker is removed individually, it is easy to do maintenance on the stocker.

What is claimed is:

1. An automatic lead feeding apparatus for feeding lead to a pencil lead-carrying writing instrument having a lead feed means for feeding lead and which is used in an automatic drafting machine having a writing instrument stocker with a plurality of writing instrument holders for removably holding writing instruments, said writing instrument stocker being rotatably mounted at a side of the drafting machine, and a line drawing head movable in a direction parallel to a platen for supporting a sheet of drawing medium and operable to mutually exchange writing instruments between the line drawing head and a writing instrument holder of the writing instrument stocker, said automatic lead feeding apparatus comprising:

a unit holder movably mounted at the side of the drafting machine frame for movement toward and away from the writing instrument stocker;

a writing instrument holding means on said unit holder for removably holding a pencil lead-carrying writing instrument and operable for mutually exchanging a pencil lead-carrying instrument between said writing instrument holding means and a writing instrument holder of the writing instrument stocker;

a lead feeding reservoir stocker having a plurality of lead reservoirs thereon, each for containing a plurality of writing leads, said lead feeding reservoir stocker being removably mounted on said unit holder above a path of movement of said writing instrument holding means on said unit holder as said unit holder moves toward and away from the writing instrument stocker, and said lead feeding reservoir stocker being movable for moving one lead reservoir at a time above said path;

a shutter mechanism mounted below said lead feeding reservoir stocker and reciprocally movable so as to cause writing leads contained in a lead reservoir positioned above said path to drop downwardly therefrom one at a time into a pencil lead carrying writing instrument therebelow; and a lead feed means actuator engagable with a pencil lead-carrying writing instrument held in said writing instrument holding means for actuating the lead feed means thereof for feeding a lead dropped into the lead-carrying writing instrument to a predetermined projected position.

2. In combination;

an automatic lead feeding apparatus for feeding lead to a pencil lead-carrying writing instrument having a lead feed means for feeding lead and which is used in an automatic drafting machine; and a writing instrument stocker with a plurality of writing instrument holders thereon for removably holding writing instruments, writing instrument stocker rotating means for rotating the instrument stocker at a side of the drafting machine having said writing instrument stocker is removably mounted thereon, the drafting machine having a line drawing head movable in a direction parallel to a platen for supporting a sheet of drawing medium and operable to mutually exchange writing instruments between the line drawing head and a writing instrument holder of the writing instrument stocker;

said automatic lead feeding apparatus comprising:

a unit holder movably mounted at the side of the drafting machine frame for movement toward and away from said writing instrument stocker;

a writing instrument holding means on said unit holder for removably holding a pencil lead-carrying writing instrument and operable for mutually exchanging a pencil lead-carrying instrument between said writing instrument holding means and a writing instrument holder of the writing instrument stocker;

a lead feeding reservoir stocker having a plurality of lead reservoirs thereon, each for containing a plurality of writing leads, said lead feeding reservoir stocker being removably mounted on said unit holder above a path of movement of said writing instrument holding means on said unit holder as said unit holder moves toward and away from the writing instrument stocker, and said lead feeding reservoir stocker being movable for moving one lead reservoir at a time above said path;

a shutter mechanism mounted below said lead feeding reservoir stocker and reciprocally movable so as to cause writing leads contained in a lead reservoir positioned above said path to drop downwardly therefrom one at a time into a pencil lead carrying writing instrument therebelow; and a lead feed means actuator engagable with a pencil lead-carrying writing instrument held in said writing instrument holding means for actuating the lead feed means thereof for feeding a lead dropped into the lead-carrying writing instrument to a predetermined projected position.

* * * * *